(12) United States Patent
Anderson

(10) Patent No.: US 9,195,639 B2
(45) Date of Patent: Nov. 24, 2015

(54) COMPUTER-BASED SYSTEM AND METHOD FOR GENERATING, CLASSIFYING, SEARCHING, AND ANALYZING STANDARDIZED TEXT TEMPLATES AND DEVIATIONS FROM STANDARDIZED TEXT TEMPLATES

(71) Applicant: The Bureau of National Affairs, Inc., Arlington, VA (US)

(72) Inventor: Robert Anderson, Malibu, CA (US)

(73) Assignee: THE BUREAU OF NATIONAL AFFAIRS, INC., Arlington, VA (US)

( * ) Notice: Subject to any disclaimer, the term of this patent is extended or adjusted under 35 U.S.C. 154(b) by 549 days.

(21) Appl. No.: 13/628,847

(22) Filed: Sep. 27, 2012

(65) Prior Publication Data

US 2013/0080886 A1      Mar. 28, 2013

Related U.S. Application Data

(60) Continuation of application No. 12/398,728, filed on Mar. 5, 2009, now Pat. No. 8,285,750, which is a division of application No. 10/640,460, filed on Aug. 13, 2003, now Pat. No. 7,519,607.

(60) Provisional application No. 60/403,319, filed on Aug. 14, 2002.

(51) Int. Cl.
*G06F 17/30* (2006.01)
*G06F 17/24* (2006.01)
*G06F 17/27* (2006.01)
*G06F 17/28* (2006.01)

(52) U.S. Cl.
CPC .......... *G06F 17/248* (2013.01); *G06F 17/2775* (2013.01); *G06F 17/2881* (2013.01)

(58) Field of Classification Search
CPC ...................................................... G06F 17/30
USPC ................................................. 707/600–899
See application file for complete search history.

(56) References Cited

U.S. PATENT DOCUMENTS

| | | | |
|---|---|---|---|
| 5,446,653 A | 8/1995 | Miller et al. | |
| 5,963,965 A * | 10/1999 | Vogel | 715/236 |
| 6,356,864 B1 | 3/2002 | Foltz et al. | |
| 6,366,892 B1 | 4/2002 | Altman et al. | |
| 6,778,703 B1 | 8/2004 | Zlotnick | |
| 2001/0051962 A1 | 12/2001 | Plotkin | |
| 2002/0002567 A1 | 1/2002 | Kanie et al. | |

* cited by examiner

*Primary Examiner* — Isaac M Woo
(74) *Attorney, Agent, or Firm* — Jon E. Gordon; Frommer Lawrence & Haug LLP

(57) ABSTRACT

A method for generating, classifying, searching, and analyzing standardized text templates drawn from a plurality of text documents and for identifying standardized text deviations from standardized text templates. Semi-standardized documents may be represented as standardized templates and deviations from standardized templates, with such templates themselves automatically generated by a computer-implemented method from a plurality of similar text documents. The method enables enhanced analysis of semi-standardized documents and automatic extraction of information from standardized text templates.

18 Claims, 8 Drawing Sheets

FIGURE 8

| \multicolumn{6}{c|}{Delta File} |
|---|---|---|---|---|---|
| Word Position | Addition | Deletion | Word Position | Addition | Deletion |
| 1 |  | 0 | 32 |  | 0 |
| 2 |  | 0 | 33 |  | 0 |
| 3 | and each of its subsidiaries | 0 | 34 |  | 0 |
| 4 |  | 0 | 35 |  | 0 |
| 5 |  | 0 | 36 |  | 0 |
| 6 | or other legal entity | 0 | 37 |  | 0 |
| 7 | organized | 1 | 38 |  | 0 |
| 8 |  | 0 | 39 |  | 0 |
| 9 |  | 0 | 40 |  | 0 |
| 10 |  | 0 | 41 |  | 0 |
| 11 |  | 0 | 42 |  | 0 |
| 12 |  | 0 | 43 |  | 0 |
| 13 |  | 0 | 44 |  | 0 |
| 14 |  | 0 | 45 |  | 0 |
| 15 |  | 0 | 46 |  | 0 |
| 16 |  | 0 | 47 |  | 0 |
| 17 |  | 0 | 48 |  | 0 |
| 18 |  | 0 | 49 |  | 0 |
| 19 | jurisdiction of its organization | 1 | 50 |  |  |
| 20 |  | 1 | 51 |  | 1 |
| 21 |  | 1 | 52 |  | 1 |
| 22 |  | 0 | 53 |  | 1 |
| 23 |  | 0 | 54 |  | 1 |
| 24 |  | 0 | 55 |  |  |
| 25 |  | 0 | 56 |  |  |
| 26 | or other | 0 | 57 |  | 0 |
| 27 |  | 0 | 58 |  | 0 |
| 28 |  | 0 | 59 |  | 0 |
| 29 |  | 0 | 60 |  | 0 |
| 30 |  | 0 | 60 |  | 0 |
| 31 |  | 0 | 61 | and its subsidiaries taken as a whole |  |

COMPUTER-BASED SYSTEM AND METHOD FOR GENERATING, CLASSIFYING, SEARCHING, AND ANALYZING STANDARDIZED TEXT TEMPLATES AND DEVIATIONS FROM STANDARDIZED TEXT TEMPLATES

CROSS-REFERENCE TO RELATED APPLICATIONS

This application is a divisional application of U.S. patent application Ser. No. 10/640,460, entitled "Computer-Based System and Method for Generating, Classifying, Searching, and Analyzing Standardized Text Templates and Deviations from Standardized Text Templates," filed Aug. 13, 2003, which is based upon and claims priority to U.S. Provisional Patent Application No. 60/403,319, filed Aug. 14, 2002, entitled "Computer-Based System And Method For Generating, Classifying, Searching, And Analyzing Standardized Text Templates And Deviations From Standardized Text Templates." The entire content of both of these applications is incorporated herein by reference.

FIELD OF INVENTION

The invention relates generally to a computer-based system and method for generating, classifying, searching, and analyzing standardized text templates drawn from a plurality of text documents and to the identification of standardized text deviations from said standardized text templates. More particularly, the invention relates to a system and method for using standardized text templates to generate, classify, search, and analyze standardized legal, commercial, business and other documents and portions of such documents.

BACKGROUND OF INVENTION

The generation of legal, commercial, business, and other documents is often based on standardized forms or on previously drafted "model" or "precedent" documents. The degree of reliance on such model or precedent documents ranges from the use of pure "fill-in-the-blank" type forms, to more free-form text based on a precedent document, but edited in a word processor. In either case, there are two principal techniques used to generate a commercial or legal document. The first is to "mark up" a precedent document taken from a similar transaction or relationship. The second is to begin with a standard form and customize the form to the particular circumstances. Both techniques allow, words, phrases, sentences, paragraphs or whole sections to be copied and pasted from other precedents or forms, as well as modified with insertions or deletions from the precedent or form.

The use of standardized forms and precedents is desirable because considerations of completeness, accuracy, legal certainty, and efficiency demand the highest degree of standardization consistent with the particular circumstances. The use of precedent documents not only renders drafting, reviewing, and proofreading less expensive, but also allows readers familiar with the precedent to more quickly and efficiently interpret the documents. While many different expressions of the same substantive terms are possible, use of a form or precedent allows the drafter to take advantage of the thought and effort embodied in the previously drafted from or precedent to avoid errors, omissions, and irrelevancies.

Whether the drafter uses a standard form or a precedent document, the state of the art may have drawback. The precedent method allows the drafter to select a document from a prior similar transaction, reducing some instances of omissions and irrelevant or incorrect inclusion of text. However, the use of such a document may expose the drafter to duplicating drafting errors in the prior document, including text that was uniquely appropriate to the particular circumstances of the prior transaction, and inadvertent omission of text that was appropriate to omit only for the prior transaction. Even documents that are prepared by expert drafters may contain errors, irrelevancies, and omissions that could be ascertained if the standardized form on which the document is based were known. Furthermore, the choice of a precedent document may be uncertain without an objective measure of its degree of standardization and conformity to industry practice.

The use of a truly standardized form, on the other hand, may allow the drafter some measure of confidence (depending on the source of the form) that the language used is reasonably representative of a standard document. Drawbacks of a standardized form may include the resources and expertise necessary to develop the form, its inflexibility in the context of varied circumstances, and the lack of guidance as to customization for particular circumstances. Notes or instructions to a standard form can provide some guidance as to a few major alternative provisions, but may not describe all of the relevant considerations for all but the simplest of forms. Further, even the largest organizations may have the resources only to develop a limited number of standard forms, and many of those forms may require ongoing updating, correction, and revision as requirements or industry customs change.

The wide variety of possible document forms and the individual deviations from those forms may also pose difficult problems for both manual and automated analysis and interpretation of documents. From the perspective of third parties who need accurate, reliable and timely analysis of business and legal documents, the automated analysis of documents may be a considerable advantage. By way of illustration, the Securities and Exchange Commission's Electronic Gathering Analysis and Retrieval system (EDGAR), which either directly or indirectly is the primary financial disclosure reference source for financial and legal professionals, contains millions of individual files, many of which contain a plurality individual documents themselves. On an average day, the EDGAR system receives over 1,000 additional filings, which can make manual analysis very costly.

In order to extract certain desired pieces of information from a complex document, the document must often be read manually. However, the document could be parsed and the relevant information extracted automatically if there were one standardized form for each type of document. In reality, however, there may be many such forms, and the forms themselves may be fluid, drifting from their original text as they are copied, adapted, recopied for another situation and adapted again. As a result, in order to automatically extract desired information from particular locations in a document, tens of thousands of possible forms may need to be manually classified and parsed, and computer routines unique to each individual form. Such a technique may only be economical for a few of the most frequently used forms, if any.

Therefore, the generation, classification, searching, and analysis of commercial, legal, and business documents may suffer from the absence of a means to identify standardized document text. In the context of both document generation and document analysis, the prior art may be insufficient to meet the foregoing needs. The prior art includes a number of systems designed to automate the generation of documents that adhere to standardized formats. U.S. Pat. No. 5,446,653 discloses a rule-based document generation system for constructing insurance policies in response to coverage information input by a user. U.S. Pat. No. 6,366,892 discloses a method for generating customized loan documents from a given database of standard provisions and optional provisions.

The prior art technologies allow the generation of a document from the basis of user-defined rules and templates. None of the prior art technologies known to applicant, however, appear to extract those rules and templates on the basis of prior documents. In addition, none of these prior art technologies appears to use these rules and templates for analyzing, as opposed to generating, customized documents. The foregoing and other problems may be solved by the system and method disclosed herein.

SUMMARY OF INVENTION

The foregoing need for a system that would increase the efficiency of generating, classifying, searching, and analyzing standardized and semi-standardized documents may be fulfilled by the invention.

The invention includes a process for generating a plurality of standardized text templates from a plurality of documents in a specified database and developing a variety of statistical and analytical information about the templates and the most common deviations from the templates. The invention may first identify standardized text templates at the paragraph level, then may identify standardized sequences of paragraph templates to create hierarchical templates of templates.

One embodiment of the invention may consist of two principal phases: a Template Generation Phase, where input documents are used to create templates, and an Operational Phase, where the templates developed are used to facilitate generating, classifying, searching, and analyzing complex standardized and semi-standardized documents. The Template Generation Phase may partition input files and documents, associate or cluster the partitioned text inputs into "families" based on document similarity, and may then generate one or more standardized templates for each family or cluster thus identified. Each input document may then be coded and stored as the combination of one or more standardized templates and the insertions and deletions (and optionally substitutions) that transform those standardized templates into the text of the input document.

The Operational Phase may allow the user to analyze a document already in the database or a new document submitted by the user. Upon receiving a user query, this embodiment of the invention may attempt to match each paragraph (or other unit of document partition) of the query document to the standardized templates stored in the database, and the sequence of paragraph templates thus identified (if any) to the standardized sequences of document templates stored in the database. Once matched to standardized templates, this embodiment of the invention may determine the deviations of the subject document from the standard document contained in the template database. In this way, the user may determine the degree of correspondence between a particular document and the standardized text, may conform an input document to a standardized text, and may find other documents based on the same form or forms.

The Operational Phase may also provide a user with statistics about the standardization of particular documents or document forms, the frequency of use of templates, the frequency of particular deviations from the standardized templates, and the interrelationship between and among the various templates. These analytical and statistical tools may allow users to determine the degree of standardization of a particular input document, to visually display non-standard sections or words of the document, and to suggest common deviations from the standardized text contained in the document. In these ways, the invention may help to automate the generation, classification, analysis and searching of standardized and semi-standardized documents.

These as well as still further features, objects and benefits of the invention will now become clear upon a review of the following "Detailed Description of the Illustrative Embodiments" and the attached drawings.

BRIEF DESCRIPTION OF DRAWINGS

FIG. 8 is an embodiment of a Delta File wherein each paragraph is stored as the combination of the standard family template plus the insertions and deletions transforming the template into the paragraph.

DETAILED DESCRIPTION OF ILLUSTRATIVE EMBODIMENTS

Figure 1:
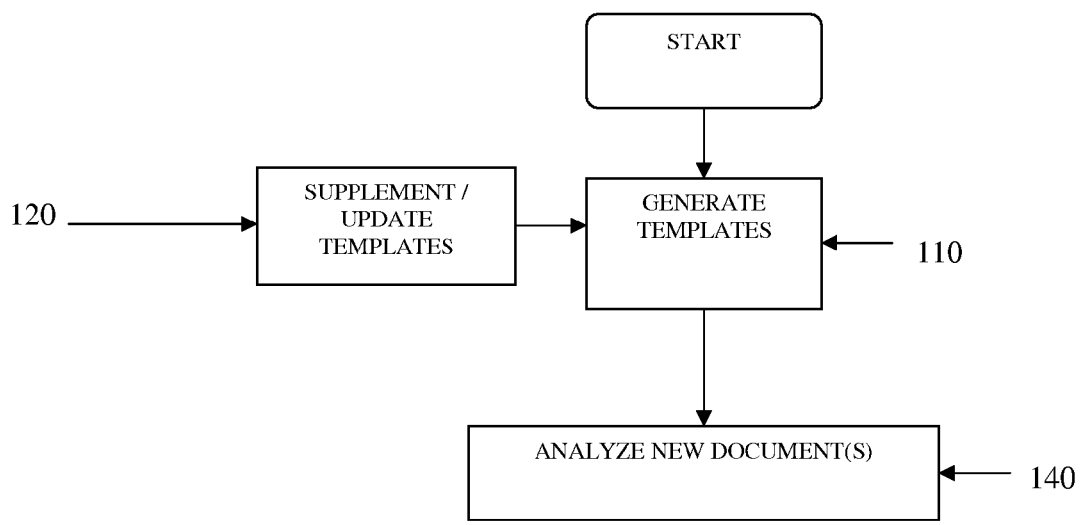
FIG. 1 is a flow chart of one embodiment of an automated process for generating templates, analyzing new documents and supplementing and updating templates.

FIG. 1 is a flow chart of one embodiment of an automated process for generating templates, analyzing new documents and supplementing and updating templates. As shown in FIG. 1, templates may be generated in a Generate Template step 110, the templates may be supplemented or updated in a Supplement/Update Templates step 120, and new documents may be analyzed in a Analyze New Document(s) step 140.

Figure 2:
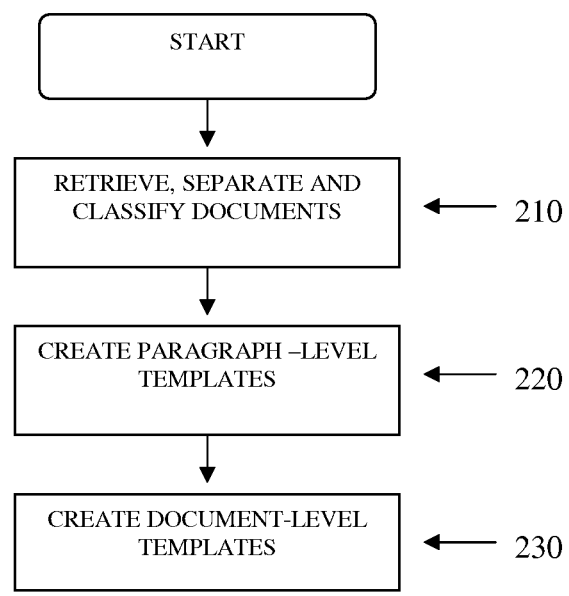
FIG. 2 is a flow chart of one embodiment of the Generate Template step shown in FIG. 1.

FIG. 2 is a flow chart of one embodiment of the Generate Template step 110 shown in FIG. 1. The Template Generation step may produce standardized text templates from a plurality of input documents. The Generate Template may step begin with the retrieval of files and the separation of files into documents to be analyzed. The retrieval and separation process may be governed by a Retrieve, Separate and Classify step 210.

Figure 3:
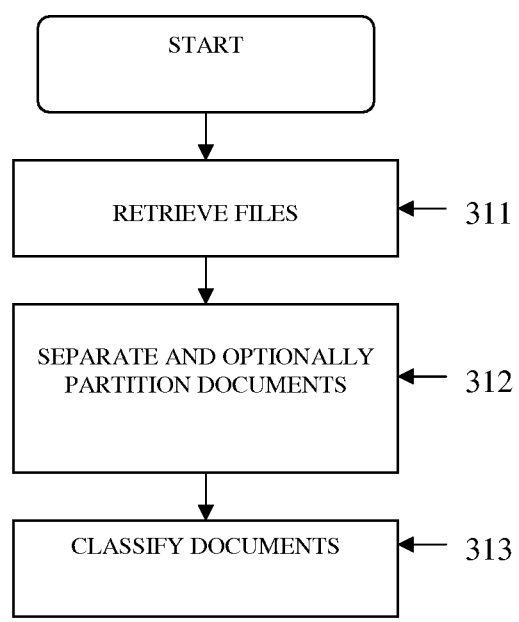
FIG. 3 is a flow chart of one embodiment of the Retrieval, Separate, and Classify step shown in FIG. 2.

FIG. 3 is a flow chart of one embodiment of the Retrieve, Separate, and Classify step shown in FIG. 2. The step may begin with a Retrieve Files step 311. The Retrieve Files step 311 may retrieve from a data source a plurality of files, each such file containing one or more documents. The files may be retrieved from the Internet, an intranet, a LAN, a publicly or privately available database, or from other storage sources. The files to be processed may be retrieved and stored locally prior to processing or they may be retrieved from their sources and processed by a retrieval sub-step one-by-one.

In either case, the text of each file may be initially separated into one or more documents in a Separate and Optionally Partition step 312. The step may be wholly automatic or partially manual and partially automatic. For example, files retrieved as submissions from the EDGAR system could be segmented automatically into documents using the document and exhibit tags employed by that system, such as the <DOCUMENT> tag. Other files may be segmented into documents using formatting information such as page breaks or headings.

Each document identified and separated in the Separate and Optionally Partition Documents step 312 may optionally then be classified in a Classify Document step 313. During the Generate Template step 110, the Classify Document step 313 may be conducted according to pre-defined criteria set by the database builder. In the context of legal documents, those categories might include, for example, the titles of legal documents, such as "License Agreement," "Purchase Agreement," "Agreement and Plan of Merger," "Bylaws," "Articles of Incorporation" or similar categories. In the commercial context, these documents may be forms, invoices, reports, or other documents.

The documents thus identified may be assigned a unique identifying document number that may identify the file from which the document was retrieved. The documents may also be assigned various user-defined transaction codes that indicate the context in which the document was used. These context identifiers might include codes for the specific type of transaction involved, the industry or state of incorporation of the company involved, or other similar identifiers. In the EDGAR context, these codes may include all of the header information contained in the EDGAR submission filing from which the documents were retrieved.

The documents may then pass into the Create Paragraph-Level Templates step 220, where standardized paragraph templates may be generated. A "paragraph" may identified, for example, in ASCII text by a carriage return (or two or more carriage returns for non-wrapping text) or in HTML documents by the <P> and </P> tags. The document may also be partitioned into "paragraphs" defined differently, whether mechanically (for example, by sections or sub-sections of a document) or conceptually (by subject matter). The term "paragraph" as used in this document shall mean any partition of a document, rather than the stricter definition implied by carriage returns or <P> </P> tags. The paragraphs so identified in each document may either be stored in a temporary memory or identified by inserting tags in the document.

The Create Paragraph-Level Templates step 220 may generate a plurality of standardized paragraph templates and associate individual paragraphs with those templates. It may begin with the first paragraph of the first document and proceed sequentially through all paragraphs of all of the documents as described below.

Figure 4:
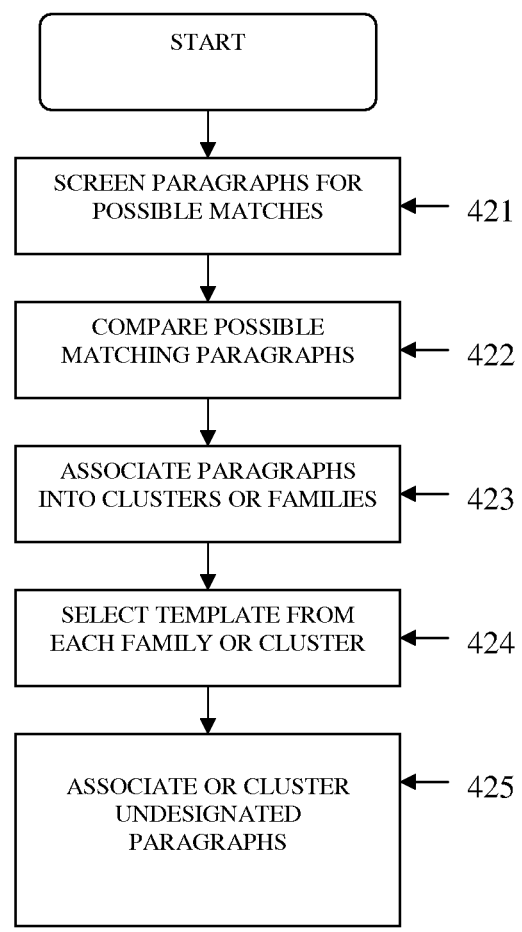
FIG. 4 is a flow chart of one embodiment of the Create Paragraph-Level Templates step shown in FIG. 2.

FIG. 4 is a flow chart of one embodiment of the Create Paragraph-Level Templates step shown in FIG. 2. The step may send the text of each paragraph under consideration through a Screen Paragraphs for Possible Matches step 421 that clusters together possible matching paragraphs in the various input documents. This step compares each paragraph of each other document for possible approximate text matches of the first paragraph. The screening comparison may be based on various techniques known in the art, such as key terms, sampling, clustering, indexing or fingerprinting. The degree of document similarity required for a screening match may be calibrated, for example, on the basis of the character of the input documents and the size and number of clusters desired.

Each paragraph of each other document returned as a possible match may be submitted to the Compare Possible Matching Paragraphs step 422. The Compare Possible Matching Paragraphs step 422 may operate on subsets of the documents in the database (such as those associated with certain criteria in the classification step), or may operate on all of them.

The Compare Possible Matching Paragraphs step 422 may be designed to compare two paragraphs (previously screened and clustered in the Screen Paragraphs for Possible Matches step 421) word-for-word to determine the degree of correspondence between them. The Compare Possible Matching Paragraphs step 422 may compare two input paragraphs (referred to herein as a base paragraph and a target paragraph) to determine the longest common subsequence (LCS) of words or characters that are identical between the two input paragraphs. The comparison may also use the "edit distance" method, which determines the least number of edit operations such as insertion, deletion and optionally substitution, to determine an optimal alignment of the words or characters in the two paragraphs. This comparison may be accomplished using various techniques known in the art such as the utility Diff in the Unix system.

The output of the Compare Possible Matching Paragraphs step 422 may consist of the LCS of the two paragraphs as well as the target paragraph's insertions and deletions from the base paragraph.

Figure 7:
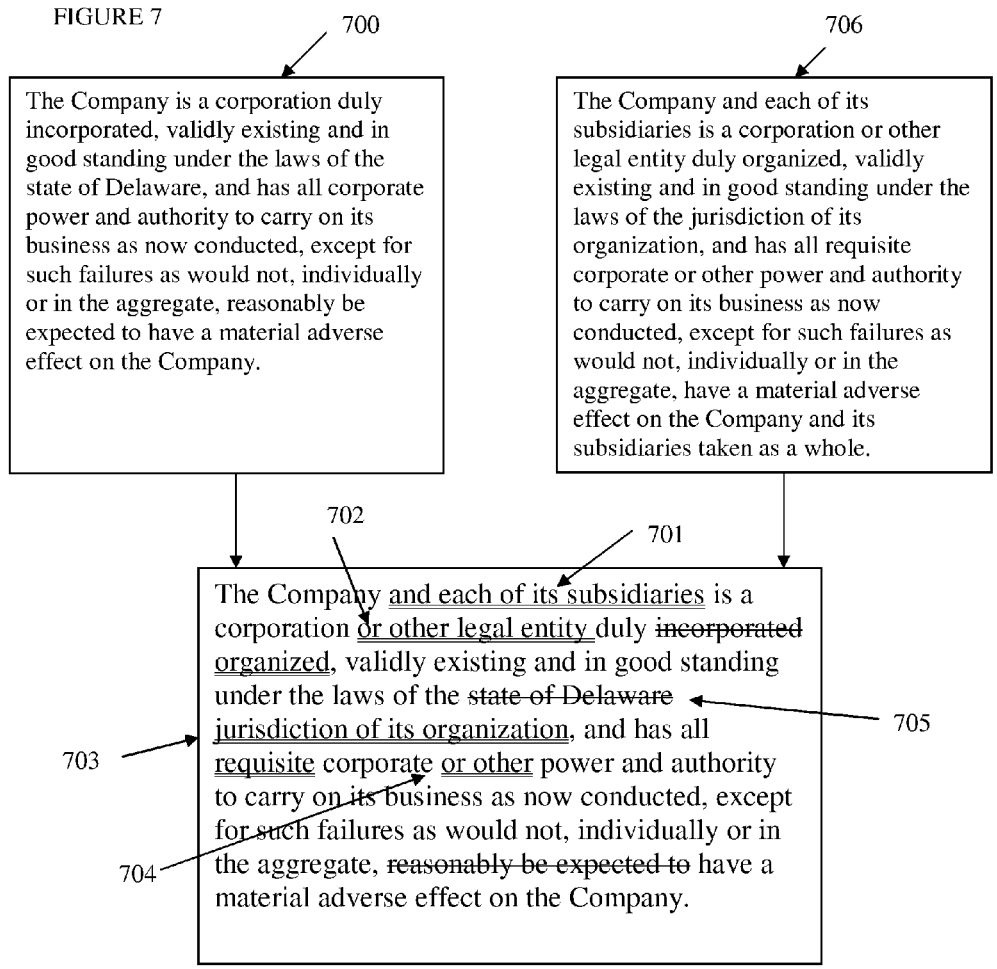
FIG. 7 is a comparison of two different paragraphs generated by a longest common subsequence algorithm, indicating insertions to the first paragraph by double underscored text and deletions from the first paragraph by strikethrough text.

FIG. 7 is a comparison of two different paragraphs generated by a longest common subsequence algorithm, indicating insertions to the first paragraph by double underscored text and deletions from the first paragraph by strikethrough text. This is sometimes called a "redline" or "blackline" version of a document. The redline version 703 displays words present in a base paragraph 700 that are not present in a target paragraph 706 as deletions (represented in FIG. 7 by strikethrough text) and words present in the target paragraph 706 that are not present in the base paragraph 700 as insertions (represented in FIG. 7 by double underscored text). The Compare Possible Matching Paragraphs step 422 may also output the positions of those insertions and deletions with respect to the sequence of words in the base paragraph.

The insertions and deletions identified by The Compare Possible Matching Paragraphs step 422, combined with their positions in the sequence of words in the base paragraph, may be the information necessary to transform the base paragraph into the target paragraph. This combination of insertions and deletions and their positions necessary to transform the base paragraph into the target text is referred to herein as the "patch" of the base text versus the target text. By inserting the insertions and deleting the deletions at the word positions indicated, the base paragraph may be transformed or "patched" into the target paragraph.

The Compare Possible Matching Paragraphs step 422 may also output a match statistic that indicates the degree of correspondence of the two input samples. The match statistic may be equal to the ratio obtained by dividing the number of matching words (or matching characters) between the two samples by the average of the number of words (or characters) in each of the two samples, with the objective of maximizing the statistic. This match statistic may be used to determine whether the base paragraph and the target paragraph are sufficiently similar to be classified as a match. The match statistic may also be calculated according to the "cost" per word or per character according to various "edit distance" formulations known in the art, where costs are assigned to edit operations such as insertions, deletions, and substitutions. For example, the "edit distance" formulation may be used with the objective of minimizing the ratio of the edit distance to the average number of words (or characters) in the two paragraphs. The match statistic may be based on words or characters, and may weight different types of words or characters differently.

In the Create Paragraph-Level step 210, as described above, each paragraph of each document may be passed through the Screen Paragraphs for Possible Matches step 421, and each preliminary match returned from the Screen Paragraphs for Possible Matches step 421 may be passed through the Compare Possible Matching Paragraphs step 422. If the Compare Possible Matching Paragraphs step 422 indicates a match statistic exceeding some threshold t (or below a threshold in the case of an edit distance statistic), the Compare Possible Matching Paragraphs step 422 may save the match statistic for that two-paragraph combination.

An Associate Paragraphs into Clusters or Families step 423 may then use the match statistics of matching paragraphs to refine the clusters initially formed by the Compare Possible Matching Paragraphs step 422 by designating sets of matching paragraphs (referred to herein as "families"). The "family" may be a set of all paragraphs from the input documents where each member has a match statistic against each other member that exceeds t (or is below t in the case of an edit distance statistic). That is, each member of the family "matches" each other member of the family to a given threshold t. Paragraphs that do not match any other paragraphs to threshold t or whose family has fewer than three members may be initially classified as undesignated paragraphs.

A Select Template From Each Family or Cluster step 424 may then use the match statistics generated in the Compare Possible Matching Paragraphs step 422 for each two-paragraph combination of each family. Select Template From Each Family or Cluster step 424 may select the one paragraph within each family with the highest average match statistic (or the least average edit distance) against all other paragraphs within the same family and preliminarily designates that paragraph as the standard family "template". The Select Template From Each Family or Cluster step 424 may select one or more alternative templates as well. The template is then refined by replacing certain words with "blanks" as described in connection with the Delta file below. Each such family template may be assigned a unique alphanumeric identifier (the Template ID) for ease of reference. The paragraphs previously described as undesignated paragraphs above may then be matched to and associated with any templates that those paragraphs match to some given threshold in an Associate or Cluster Undesignated Paragraphs step 425.

The family template selected in the Select Template From Each Family or Cluster step 424 may also select a template from a subset of the family, instead of the entire family of all matching paragraphs. For example, a template may be selected from those paragraphs within a family that meet certain transactional criteria identified in the Retrieve, Separate and Classify Documents step 210. Further, a template may be selected from the set of those paragraphs that are drawn from a certain position in a document-level template described below. In either case, the template selection process may be the same, except that a subset of the paragraphs in a particular family may be used to select the template, rather than the entire family of paragraphs.

FIG. 8 is an embodiment of a Delta File wherein each paragraph is stored as the combination of the standard family template plus the insertions and deletions transforming the template into the paragraph. Once a family template is selected, whether for the entire family set or for a subset of the family, each paragraph in the family (or the subset, as applicable) may be then reduced to a format where the paragraph is stored as the combination of the standard family template and its "patch" information as illustrated in FIG. 8. The information in the patch stored in this manner is referred to herein as the "Delta File". A word that is replaced with one or more other words may be reflected as an insertion first, then a deletion, as is the case with the word "organized" in 803. An insertion adjacent to more than one deletions is considered to have the word position of the first deleted word, as is the case with "jurisdiction of its organization" 802, which is placed in the Delta File at word position 19.

The next step in the Generate Template step 110 may be a Create Document-Level Templates step 230. The Create Document-Level Templates step 230 may identify "base" document templates for documents that contain a plurality of paragraphs. For this purpose, the Create Document-Level Templates step 230 may represent the input documents in terms of the paragraph-level templates identified in the Create Paragraph-Level Templates step 220 and those paragraphs' deviations from those standardized templates (the Delta Files). Thus, each input document containing a plurality of paragraphs may be stored in terms of a sequence of Template IDs and a sequence of Delta Files transforming those templates into the original paragraphs.

The a Create Document-Level Templates step 230 may use this representation of the input documents as a series of paragraph template IDs in order to generate templates at the document level.

Figure 5:
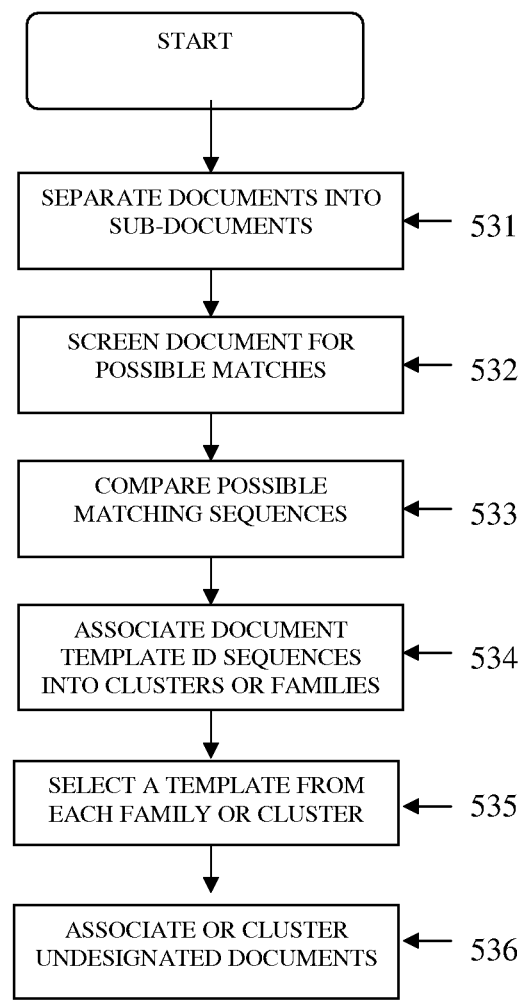
FIG. 5 is a flow chart of one embodiment of the Create Document-Level Templates step shown in FIG. 2.

FIG. 5 is a flow chart of one embodiment of the Create Document-Level Templates step shown in FIG. 2. At this stage, documents may optionally be further segmented in Separate Documents into Subdocuments step 531. The Separate Documents into Subdocuments step 531 may separate documents based on breaks in the Recognition Density of the paragraphs in the document. The Recognition Density is a statistic calculated for each paragraph in a document as the sum of a series of terms (each such term representing a paragraph) consisting of a weight multiplied by a function. The function takes the value 1 if a paragraph matches a sufficient number of other paragraphs in the Screen Paragraphs For Possible Matches step 421 and 0 if the paragraph does not match a sufficient number of other paragraphs.

For example, the Recognition Density at paragraph i could be defined as $\Sigma_{k=0}^{2n} W(i+n-k)B(i+n-k)$, where $B(x)$ is a function taking the value 1 if the paragraph assigned to its argument exceeds some given recognition statistic and 0 if the paragraph assigned to its argument its argument does not exceed the recognition statistic. $W(x)$ is a weight assigned to a paragraph that is n paragraphs before (for negative n−k) or after (for positive n−k) paragraph I, where $\Sigma_{k=0}^{2n} W(i+n-k) = 1$, and $W(x)$ decreases as |n−k| increases. For example, if n were 1, only the immediately adjacent paragraphs to paragraph i would be considered in the Recognition Density. Preferably, however, the number of paragraphs on either side of i contributing to the Recognition Density at paragraph i would likely be more than one.

Series of unbroken paragraphs with Recognition Densities above a threshold d may be kept together as integral documents. If the Recognition Density falls below d for any paragraph, that paragraph may be considered as one endpoint of the document. In this way, a single document may be broken into a plurality of documents if breaks exist in the Recognition Density, each of which is treated as a separate document. The Recognition Density may also be calculated in a directional manner to calculate beginning and end points of documents based only on the text before and after the relevant paragraph, respectively. The Recognition Density concept allows the Document Template Generation Step to construct sequences of recognized paragraphs contained in longer documents of unrecognized paragraphs.

After completion of document separation, the Create Document-Level Templates step 230 uses its own version of a Screen Document for Possible Matches step 532 and Compare Possible Matching Sequences step 533 that operate on the sequences of Template IDs contained in the documents the same way the Screen Paragraphs for Possible Matches step 421 and Compare Possible Matching Paragraphs 422 operate on the sequences of words contained in the paragraphs. The Screen Document for Possible Matches step 532 may first screen each document against each other document to find possible matches based on the sequences of template IDs representing the paragraphs in the documents. The Compare Possible Matching Sequences step 533 may then perform a Template ID comparison of each pair of possible matches returned from the Screen Document for Possible Matches step 532 using the Compare Possible Matching Sequences step 533. As in the Create Paragraph-Level Templates step 220, documents may be arranged into clusters or sets called "families," where each member matches each other member at a given match statistic.

The Create Document-Level Templates step 230 may then performs a template selection at the document level analogous to the template selection performed at the paragraph level in the Select Template from Each Family or Cluster step 424. A Select a Template from Each Family or Cluster step 535 may select as a document-level template for each family, the document (represented by a sequence of Template IDs) that exhibits the highest average match statistic with respect to all other documents in the same family. The template thus selected is then refined by coding as "blanks" any paragraphs with a template recognition score below some threshold z. The document thus selected will be a sequence of paragraph-level Template IDs. As was done at the paragraph level, any documents previously described as undesignated may then be matched to and associated with any templates that those paragraphs match to some given threshold in an Associate or Cluster Undesignated Documents step 536.

As the text of each document from the input collection is processed into standardized templates, a record may be kept of the co-existence of each paragraph template with each other paragraph template in each document, for example by the use of an n-dimensional paragraph template correlation matrix. The number of dimensions n could be larger than 2, subject to computational space and time constraints. Each time a particular template appears in a document with another template, the value in the paragraph template correlation matrix associated with the two templates may be incremented by one. Each cell of the matrix may also contain, instead of a number, a vector containing the unique document numbers of each occurrence and co-occurrence of the particular template. Either way, the embodiment may also indicate the number of times any two (or optionally n) templates occur together. This may allow the calculation of the joint frequency distribution of each template against each other template, as well as the marginal frequency distribution of each template and the conditional frequency distribution of each template with respect to each other template.

In one embodiment, the completion of the Create Paragraph-Level Templates step 220 and the Create Document-Level Templates step 230 may mark the end of the Generate Templates step 110 and the beginning of the Analyze New Document(s) step 140.

The Analyze New Document(s) step 140 may use paragraph and document templates and Delta Files generated in the Create Paragraph Templates step 220 and the Create Document Templates step 230 to perform various analyses requested by a user on documents either previously entered into the system or new documents submitted by the user. The Operational Phase allows a user to determine the degree of standardization of a document or portions of a document, to suggest common deviations from a standardized document, to find documents or paragraphs matching given templates, and to perform various other analyses of documents.

The Delta Count process may provide statistics on the frequencies of particular deviations from the standardized templates using the Delta Files. The Delta Count process may count the number of times a particular deviation from a particular template occurs at a particular position in that template. In the context of paragraph templates, the Delta Count process may count the number of times a particular deviation from a paragraph template (referred to herein as a "Paragraph Delta") occurs at a particular position in that template. In the context of document templates, the Delta Count process may count the number of times a particular deviation from a document template (referred to herein as a "Document Delta") occurs at a particular position in that template.

The "Delta" is defined herein as the edit operations (insertions and deletions) that are contained between two matching words in a Delta File—i.e. between two word positions where the deletion column of the Delta File contains a zero. Specifically, a Delta is an insertion, a deletion, a series of unbroken deletions, or an insertion and an unbroken series of deletions in a Delta File, in each case immediately preceded and immediately followed by word positions in the relevant Delta File not containing deletions. Thus, a Delta begins with a word position containing an insertion or deletion immediately preceded by a word position not containing a deletion. The Delta continues through any unbroken series of deletions and ends at (and includes) the word position immediately prior to the first word position not containing a deletion. For example, Delta 802 begins at line 19 in the Delta file of FIG. 8 and continues through line 21.

The Delta Count process may then proceed through the Delta Files for each template, identifying the beginnings and ends of individual Deltas in the Delta Files for that template. The individual Deltas are coded as sequences, where each item in the sequence consists of the combination of (1) the word position number in the template and (2) a word forming a part of an insertion or the deletion code for a deletion (each pair of (1) and (2) is referred to as a "Delta Item"). For each Delta containing an insertion, each of the words contained in the insertion, together with its associated word position (which for any insertion is always the first word position of the relevant Delta), constitutes a separate Delta Item. Each word deletion (if any) contained in the Delta also constitutes a Delta Item and is part of the sequence.

These sequences of Delta Items for each template may then be matched using a matching algorithm and sorted into "families." The matching algorithm may take two input Deltas and finds the LCS of the Delta Items contained in the Deltas. For the purposes of this matching algorithm in the embodiment discussed above, Delta Items that contain insertion words may not match unless both the inserted word and the word position of the inserted word are identical. In this embodiment, Delta Items that are deletions may not match unless both Delta Items are deletions and the word positions of the deletions are identical. Other embodiments could allow insertions to match other insertions at a position not identical, but within some range of the first insertion. Delta Items that match at some threshold may be sorted into families as was the case with templates. A template selection process is used similar to that of the Select Template from Each Family or Cluster step 424, but operating on the Deltas in a family of Deltas instead of paragraphs in a family of paragraphs. Delta Items may be created both at the individual word insertion and deletion level (for paragraph templates) and at the paragraph insertion and deletion level (for document templates).

The Delta Count process may allow the most common Deltas (herein "Common Deltas") to be chosen for each template. The template of those Delta families that have a count exceeding some threshold c may be stored as Common Deltas for each template. The number of individual Deltas in a particular family may constitute the count of that particular Common Delta. Each Common Delta may contain the coding of the template for that Common Delta and a list of all the paragraphs containing that Delta. The coding for the template may consist of the coding for Delta Items, described above. By comparing the total number of paragraphs in a paragraph family and the total number of Deltas in a Delta family for that paragraph template, the Delta Count process may thereby give the percentage of paragraphs matching a particular template that contain a particular Common Delta.

The Delta Point process, which was mentioned above, may find in the paragraph and document templates the conceptual equivalent of the "blanks" that would be in a preprinted form. This process may allow the automatic extraction of information from the "blanks", as well as refinement of the paragraph and document templates.

The Delta Point process may locate the "blanks" by determining, for each paragraph (or document) template, the word (or paragraph) positions in the template that are most frequently subject to modification from document to document. One point of significance of these "blanks" is that once the templates are formed, the words contained in those positions are not compared when the template is compared against another paragraph or document—that is, they do not contribute to edit distance, and they are excluded from the word count when calculating a match statistic. This enhances the accuracy of the paragraph and document templates by eliminating non-standardized portions of the selected templates.

The Delta Point process may begin by sequentially examining, for a particular paragraph (or document) template, each word (or paragraph) position in that template for each paragraph (or document) in the family and counting the number of paragraphs (or documents) in which the word (or paragraph) position contains a deletion in the Delta Files. If a particular word (or paragraph) in the family template is deleted more than some certain percentage of the time, that word (or paragraph), together with one or more words (or paragraphs) adjacent that vary similarly, may be classified as a Delta Point in the template.

The location of Delta Points allows the statistical module to automatically locate and extract transaction-specific information from a document. This information could optionally include, among other things, the names of the parties to a contract, prices, dates, and similar classes of information that varies from agreement to agreement. For example, if the class of documents under consideration were a series of promissory notes, the basic terms of the notes would likely remain largely the same among all of the examples, but the interest rate and the name of the borrower would likely be different in most, if not all, of the examples. The Delta Points, once identified, may also be coded with information about the type of information contained at those Delta Points. For example, a particular word position that is a Delta Point may be identified by a user to contain a price, and the user could then automatically extract all prices from all paragraphs matching that paragraph template in the document collection.

An Implied Delta process is an analytical tool that may be employed. The Implied Delta process may determine, for any particular Common Delta (the "independent Delta"), the changes that are commonly made to the same or other templates when the first Common Delta exists in the first template (each a "dependent Delta"). For example, in FIG. 7, a common Delta might be the insertion of the language "and each of its subsidiaries" 701 at the location indicated. The user may also need to know, however, that when said language 701 is added, the language "or other legal entity" 702, the language "jurisdiction of its incorporation" 203 and the language "or other" 704 is commonly inserted at the locations indicated, and that the language "state of Delaware" 705 is commonly deleted at the location indicated.

The Implied Delta process could function by finding statistically significant correlations between Common Deltas in the same or different templates. Given a particular independent Delta, the Implied Delta process could retrieve from the Common Delta Template for that Delta the identifiers of all of the paragraphs containing the Delta.

The step could then find the count of all Common Deltas in the set of all documents in which the independent Delta is found (i.e. determines how many times each Common Delta appears among the document that contain the independent Delta). That number is then expressed for each Common Delta as a percentage of the number of paragraphs in the family from which the Common Delta arose, limited to that set of documents that contained the independent Delta. These percentages could then be compared, for each Common Delta, to the total count of such Common Delta as a percentage of the total number of paragraphs contained in the family from which the Common Delta arose for all documents. The difference between these two percentages (if any) could then be tested for statistical significance based on the number of paragraphs constituting the denominators of the two percentages calculated above. This process would return the dependent Deltas that, from a statistical perspective, are correlated with the independent Delta.

This embodiment of the invention may also optionally determine certain relationships among various portions of a single document and ascertain the incidence of those same relationships among other documents. Each time one template is included in a document with another template, the an Equality process could determine which word positions in the two templates contain the same entries. These word positions may be equal because the two templates contain identical words in those positions, or they may be equal because the Deltas from the standard templates are equal at those word positions. If the number of documents in which the two templates are included exceeds a statistically significant number n and the percentage of documents in which the word positions are equal exceeds some threshold t, then the word positions would be considered equal. When a user submits a document for analysis where two word positions coded as equal are different, the system could identify that fact to the user.

A Delta Point Statistical process may examine the deviations contained in the deviation templates at each Delta Point to determine whether the deviations at those Delta Points contain numerical figures. Numerical figures would include, without limitation, numbers, dollar amounts, percentages, decimals, ratios, etc. Where a certain percentage of the deviations at a particular Delta Point consist of numerical figures, the Data Point Statistical process can take averages, medians, modes, variances, and standard deviations of the numerical figures, computing statistics for each type of numerical figures (e.g. percentages compared to percentages, dollar amounts compared to dollar amounts, and so on).

Figure 6:
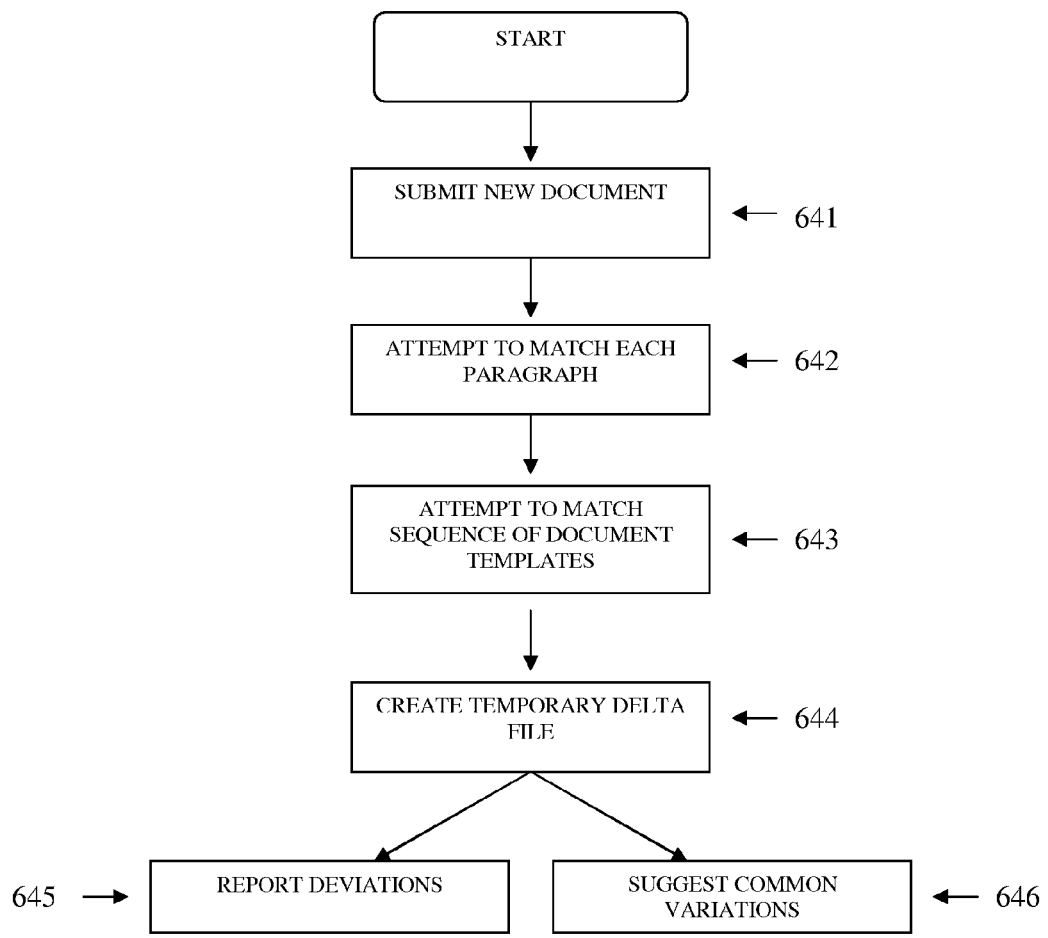
FIG. 6 is a flow chart of one embodiment of the Analyze New Document(s) step shown in FIG. 1.

FIG. 6 is a flow chart of one embodiment of the Analyze New Document(s) step shown in FIG. 1. The inventive method described herein may be used to analyze documents, whether those documents are submitted by a user or previously existing in the document database. When a new document is submitted, as reflected in a Submit New Document step 641, the first step may be an Attempt to Match Each Paragraph step 642 that would attempt to match each paragraph of the new document to an existing paragraph template. The identified sequences of paragraph templates may then be compared to document template sequences already in the database, as reflected by an Attempt to Match Sequence of Document Templates step 643. If matches are detected at the paragraph or document level or both, temporary Delta Files may be created for the document at the paragraph and document template levels, as reflected in a Create Temporary Delta File step 644. In this way, a user can view the deviations of the document from standard versions, as reflected in a Report Deviations step 645, can use the Common Deltas to suggest alternative language, as reflected in a Suggest Common Variations Step 646, and/or can perform other document analyses.

The Operational Phase of the preferred embodiment of the invention could also allow a user to find other documents in the database that match a particular document according to various criteria. For example, a user may input a particular document or paragraph, and wish to retrieve all other documents or paragraphs based on the input sample. The embodiment of the invention would attempt to match the input sample to templates for the paragraph, document, or portion of a document, and match any Deltas the user might request.

The various process steps of the invention may be implemented with a broad variety of hardware and software, as should now be readily apparent. This includes stand-alone and networked systems, single and multi-user systems, wired and wireless systems, as well as combinations of these systems. A software module may be written to perform each step of the invention, with the necessary or desired input and output, and with appropriate linkage to the other software modules, all in accordance with well known programming techniques.

As will be obvious to those skilled in the art, the invention can be practiced with a wide variety of modifications and variations, and is not limited to the embodiments described herein, but should be construed to extend to modifications and variations within the spirit and scope of the invention.

What is claimed is:

1. A computer system configured to automatically analyze text documents by performing the following steps:
    comparing text from a subject text to text of a plurality of given text templates, each text template containing at least one paragraph of text;
    determining which given text template or text templates has text that matches the text from the subject text document to a given degree of correspondence;
    generating a report of the differences between the text from the subject text document and the text of the matching text template or text templates;
    comparing a family of specimen text documents;
    identifying one paragraph of text within one of the family of specimen text documents that most closely matches a paragraph of text in all of the other specimen text documents, as compared to all of the other paragraphs in the one specimen text document; and
    generating one of the text templates containing at least the one identified paragraph of text.

2. The computer system of claim 1 wherein the identifying the paragraph that most closely matches step uses an edit distance algorithm.

3. The computer system of claim 1 wherein the identifying the paragraph that most closely matches step uses a longest common subsequence algorithm.

4. The computer system of claim 1 wherein the determining matches to a degree of correspondence step uses an edit distance algorithm.

5. The computer system of claim 1 wherein the determining matches to a degree of correspondence step uses a longest common subsequence algorithm.

6. The computer system of claim 1 wherein the differences in the report are computed according to an edit distance algorithm.

7. Non-transitory, tangible, computer readable media containing computer programming instructions that, when loaded in a computer system having a memory, cause the computer system, in response to user commands, to automatically analyze text documents by performing the following steps:
    comparing text from a subject text document to text of a plurality of given text templates, each text template containing at least one paragraph of text;
    determining which given text template or text templates has text that matches the text from the subject text document to a given degree of correspondence;
    generating a report of the differences between the text from the subject text document and the text of the matching text template or text templates;
    comparing a family of specimen text documents;
    identifying one paragraph of text within one of the family of specimen text documents that most closely matches a paragraph of text in all of the other specimen text documents, as compared to all of the other paragraphs in the one specimen text document; and
    generating one of the text templates containing at least the one identified paragraph of text.

8. The media of claim 7 wherein the identifying the paragraph that most closely matches step uses an edit distance algorithm.

9. The media of claim 7 wherein the identifying the paragraph that most closely matches step uses a longest common subsequence algorithm.

10. The media of claim 7 wherein the determining matches to a degree of Correspondence step uses an edit distance algorithm.

11. The media of claim 7 wherein the determining matches to a degree of correspondence step uses a longest common subsequence algorithm.

12. The media of claim 7 wherein the differences in the report are computed according to an edit distance algorithm.

13. A computer-implemented method of automatically analyzing text documents in which a computer performs the following steps:
    comparing text from a subject text to text of a plurality of given text templates, each text template containing at least one paragraph of text;
    determining which given text template or text templates has text that matches the text from the subject text document to a given degree of correspondence;
    generating a report of the differences between the text from the subject text document and the text of the matching text template or text templates;
    comparing a family of specimen text documents;
    identifying one paragraph of text within one of the family of specimen text documents that most closely matches a paragraph of text in all of the other specimen text documents, as compared to all of the other paragraphs in the one specimen text document; and generating one of the text templates containing at least the one identified paragraph of text.

14. The computer-implemented method of claim 13 wherein the identifying the paragraph that most closely matches step uses an edit distance algorithm.

15. The computer-implemented method of claim 13 wherein the identifying the paragraph that most closely matches step uses a longest common subsequence algorithm.

16. The computer-implemented method of claim 13 wherein the determining matches to a degree of correspondence step uses an edit distance algorithm.

17. The computer-implemented method of claim 13 wherein the determining matches to a degree of correspondence step uses a longest common subsequence algorithm.

18. The computer-implemented method of claim 13 wherein the differences in the report are computed according to an edit distance algorithm.

* * * * *

UNITED STATES PATENT AND TRADEMARK OFFICE
CERTIFICATE OF CORRECTION

PATENT NO. : 9,195,639 B2  
APPLICATION NO. : 13/628847  
DATED : November 24, 2015  
INVENTOR(S) : Robert Anderson Page 1 of 1

It is certified that error appears in the above-identified patent and that said Letters Patent is hereby corrected as shown below:

In the specification,

At CROSS-REFERENCE TO RELATED APPLICATIONS, column 1, lines 11-22:

"This application is a divisional application of U.S. patent application Ser. No. 10/640,460, entitled "Computer-Based System and Method for Generating, Classifying, Searching, and Analyzing Standardized Text Templates and Deviations from Standardized Text Templates," filed Aug. 13, 2003, which is based upon and claims priority to U.S. Provisional Patent Application No. 60/403,319, filed Aug. 14, 2002, entitled "Computer-Based System And Method For Generating, Classifying, Searching, And Analyzing Standardized Text Templates And Deviations From Standardized Text Templates." The entire content of both of these applications is incorporated herein by reference."

Should Read --This application is a continuation application of U.S. patent application 12/398,728 now U.S. Patent number 8,285,750, filed on March 5, 2009 entitled "Computer-Based System And Method For Generating, Classifying, Searching, And Analyzing Standardized Text Templates And Deviations From Standardized Text Templates." which is a divisional application of U.S. patent application Ser. No. 10/640,460, entitled "Computer-Based System and Method for Generating, Classifying, Searching, and Analyzing Standardized Text Templates and Deviations from Standardized Text Templates," filed Aug. 13, 2003, which is based upon and claims priority to U.S. Provisional Patent Application No. 60/403,319, filed Aug. 14, 2002, entitled "Computer-Based System And Method For Generating, Classifying, Searching, And Analyzing Standardized Text Templates And Deviations From Standardized Text Templates." The entire content of the aforementioned applications is incorporated herein by reference.--

Signed and Sealed this  
Twenty-second Day of March, 2016

Michelle K. Lee  
*Director of the United States Patent and Trademark Office*